United States Patent
Kravets et al.

(10) Patent No.: US 12,251,658 B2
(45) Date of Patent: Mar. 18, 2025

(54) SYSTEM, APPARATUS, AND METHOD FOR CAPTURE OF MULTI-POLLUTANTS FROM INDUSTRIAL GASES AND/OR EXHAUSTS

(71) Applicants: Aleksandr Kravets, Bridgewater, NJ (US); Donald Nelson Grace, Boynton Beach, FL (US)

(72) Inventors: Aleksandr Kravets, Bridgewater, NJ (US); Donald Nelson Grace, Boynton Beach, FL (US)

( * ) Notice: Subject to any disclaimer, the term of this patent is extended or adjusted under 35 U.S.C. 154(b) by 0 days.

(21) Appl. No.: 18/538,251

(22) Filed: Dec. 13, 2023

(65) Prior Publication Data

US 2024/0207772 A1 Jun. 27, 2024

Related U.S. Application Data

(60) Provisional application No. 63/476,414, filed on Dec. 21, 2022.

(51) Int. Cl.
*B01D 53/00* (2006.01)
*B01D 45/04* (2006.01)
*B01D 53/26* (2006.01)

(52) U.S. Cl.
CPC ........... *B01D 53/002* (2013.01); *B01D 45/04* (2013.01); *B01D 53/265* (2013.01);
(Continued)

(58) Field of Classification Search
CPC .... B01D 53/002; B01D 45/04; B01D 53/265; B01D 2257/404; B01D 2257/504; B01D 2257/80
See application file for complete search history.

(56) References Cited

U.S. PATENT DOCUMENTS

| | | | | |
|---|---|---|---|---|
| 5,450,728 A | * | 9/1995 | Vora | F25J 3/08 62/912 |
| 5,467,722 A | * | 11/1995 | Meratla | F23J 15/06 62/7 |

(Continued)

OTHER PUBLICATIONS

Carbon Dioxide Capture Technology Options, National Energy Technology Laboratory, U.S. Department of Energy, printed Nov. 28, 23 from https://netl.doe.gov/research/coal/energy-systems/gasification/gasifipedia/capture (3 pages).

(Continued)

*Primary Examiner* — Frank M Lawrence, Jr.
*Assistant Examiner* — Phillip Y Shao

(57) ABSTRACT

A method is disclosed. The method includes directing a stream into a compressor station, the stream being a pre-cooled effluent gaseous stream including $N_2$, $O_2$, $CO_2$, water vapor, and hazardous emissions when it is directed into the compressor station, bringing the stream to a medium range pressure by performing an isothermal compression using the compressor station, sending the stream into a first regenerative heat exchanger, at which a temperature of the stream is lowered to below a condensation temperature of $CO_2$ by the purified cold stream after its expansion in the downstream expander and causing partial stream liquefaction thereby transitioning or transforming the incoming stream into a two-phase stream, directing the two-phase flow into one or more inertia separators to collect said liquid phase including liquefied emissions and $CO_2$ in a pressurized storage, and directing a thusly purified gaseous portion of a two-phase stream that leaves the one or more inertia separators into an expander.

19 Claims, 5 Drawing Sheets

(52) U.S. Cl.
CPC .. *B01D 2257/404* (2013.01); *B01D 2257/504* (2013.01); *B01D 2257/80* (2013.01)

(56) References Cited

U.S. PATENT DOCUMENTS

| | | | | |
|---|---|---|---|---|
| 6,301,927 | B1* | 10/2001 | Reddy | F25J 3/0252 |
| | | | | 62/619 |
| 8,741,225 | B2 | 6/2014 | Oppenheim | |
| 9,371,755 | B2* | 6/2016 | Hamad | B01D 53/343 |
| 9,683,737 | B2 | 6/2017 | Ryu | |
| 10,315,150 | B2* | 6/2019 | Huntington | F25J 3/0266 |
| 10,589,224 | B2 | 3/2020 | Verbakel | |
| 10,989,113 | B2 | 4/2021 | Forrest | |
| 11,035,260 | B1 | 6/2021 | Kravets | |
| 11,174,759 | B2 | 11/2021 | Allam | |
| 11,761,363 | B2 | 9/2023 | Sharma | |
| 11,806,663 | B2 | 11/2023 | Voskian | |
| 2008/0176174 | A1* | 7/2008 | White | B01D 63/08 |
| | | | | 431/115 |
| 2010/0024476 | A1* | 2/2010 | Shah | B01D 53/002 |
| | | | | 95/41 |
| 2012/0000243 | A1* | 1/2012 | Bough | C01B 3/16 |
| | | | | 62/617 |
| 2012/0137728 | A1* | 6/2012 | Zanganeh | B01D 53/002 |
| | | | | 62/617 |
| 2012/0180657 | A1* | 7/2012 | Monereau | F25J 3/067 |
| | | | | 95/290 |
| 2013/0202517 | A1* | 8/2013 | Ayala | B01D 53/1475 |
| | | | | 423/437.1 |
| 2015/0010873 | A1 | 1/2015 | Ryu | |
| 2015/0376801 | A1* | 12/2015 | Bairamijamal | C25B 9/05 |
| | | | | 518/704 |
| 2023/0338896 | A1 | 10/2023 | Gao | |
| 2023/0349632 | A1 | 11/2023 | Hendricks, Jr. | |

OTHER PUBLICATIONS

2. I.Y.Mohammed et al. Comparison of Selexol™ and Rectisol® Technologies in an Integrated Gasification Combined Cycle (IGCC) Plant for Clean Energy Production. International Journal of Engineering Research vol. No. 3, Issue No. 12, pp. 742-744, Dec. 1, 2014 (3 pages).

J. Trembley, O. Beteta (Air Products) "A cost-efficient energy transition solution delivering safe, sustainable and reliable solvent abatement and VOC recovery for pharmaceutical manufacturers" (Using Cryogenic Condensation to Control Organic Vapor Emissions). Process Cooling, Jan. 2014 (5 pages).

Recompression Brayton Cycle Flow-Diagram, National Energy Technology Laboratory, U.S. Department of Energy, printed Nov. 28, 2023 from https://netl.doe.gov/sites/default/files/inline-images/Recompression-Brayton-Cycle-Flow-Diagram_2.png (1 page).

Oxy Combustion Process for CO2 Capture from Power Plants. IEA Greenhouse Gas R&D Program. Report No. 2005/9, Jul. 2005 (212 pages).

S.Abuelgasim, W.Wang, A.Abdalazeez. A brief review for chemical looping combustion as a promising CO2 capture technology: Fundamentals and progress. Science of The Total Environment, vol. 764. Apr. 10, 2021, 142892 https://www.sciencedirect.com/science/article/abs/pii/S0048969720364226 (13 pages).

M.R.M. Abu-Zahra, P.H.M. Feron, excerpt (29.2.2 Cryogenic Technique) from "in Absorption-Based Post-combustion Capture of Carbon Dioxide" dated 2016 (https://www.sciencedirect.com/topics/engineering/cryogenic-separation) (2 pages).

Tengku Nur Adibah Tengku Hassan, et.al. Insights on Cryogenic Distillation Technology for Simultaneous CO2 and H2S Removal for Sour Gas Fields. Published online Feb. 19, 2022 at https://www.mdpi.com/1420-3049/27/4/1424 (25 pages).

* cited by examiner

A − A

B − B

SYSTEM, APPARATUS, AND METHOD FOR CAPTURE OF MULTI-POLLUTANTS FROM INDUSTRIAL GASES AND/OR EXHAUSTS

RELATED APPLICATIONS

This application claims the benefit of U.S. Provisional Patent Application No. 63/476,414 filed on Dec. 21, 2022, which is hereby incorporated by reference in its entirety.

TECHNICAL FIELD

The present disclosure generally relates to a system, apparatus, and method for capture, and more particularly to a system, apparatus, and method (e.g., a singular method) for capture of a variety of impurities from polluted gases and/or exhausts from power and/or industrial plants.

BACKGROUND

Rising global temperatures within the past 40 years is often attributed (either in part or in total) to the increase of carbon dioxide ($CO_2$) concentrations in the atmosphere resulting from worldwide use of fossil fuels by transportation, industrial, power generation, commercial and residential sectors. Such conclusions have raised worldwide concern regarding the potential impact of such a trend on climate change. Moreover, the increased level of $CO_2$ in the atmosphere, in combination with water evaporation from natural resources (oceans, lakes, rivers), aggravates the impact of greenhouse gases on the environment. Therefore, reducing water vapor amounts expelled into atmosphere by suppressing water vapor generated by combustion of fossil fuels (primarily from utility-size power and industrial plants, vaporization of water in cooling towers, and wet scrubbers) will minimize the overall impact of greenhouse gases on the atmosphere associated with anthropogenic activity. Yet, it is of utmost importance to achieve such suppression of $CO_2$, water vapor, and hazardous emission to the atmosphere in a most economical manner to ensure a continued and sustainable development of humankind.

At this time, both political and regulatory pressures to limit $CO_2$ emissions continue to grow along with various incentives for low carbon and carbon capture technologies. The U.S. nationwide plan is to become carbon neutral by 2050. In 2019, energy-related $CO_2$ generation reached about 5,000 Million Metric Tons (MMT). According to the Energy Information Agency, the major contributors to $CO_2$ emissions due to use of fossil fuels was: a) transportation (~37%), b) Electrical Power Generation (~32%), and c) Industry (~20%). Based on the above, the major effort for curbing $CO_2$ emittance should be concentrated on electric power generation and industrial sectors (e.g., especially if the fuel use by transportation may be minimized by the wide-spread implementation of electric vehicles).

An effective technique for $CO_2$ reduction for the power industry is to retire old coal fired plants, use more efficient natural gas combined cycle plants, and switch most modern coal-fired plants to natural gas-fired operations. A second, widely accepted path involves substantial increase of power generation by alternative, renewable power sources (primarily wind and solar). However, despite the installed capacity for the latter having grown tremendously to reach about one-third of the USA total in 2023 (1.3 million megawatt), they are only capable of satisfying ~13% of total electric energy U.S. consumption. With respect to overall USA energy consumed in 2021, the wind and solar contribution was about 5%. Today, fossil fuel delivers ~80% of the USA energy needs, with the balance of capacity coming primarily from nuclear and hydropower plants.

Although hydropower plants do not produce carbon dioxide, their installed capacities are not expected to grow and therefore would have no significant impact on the U.S.'s $CO_2$ emissions balance. Only a minor impact on $CO_2$ may be possible with the help of nuclear power plants that may contribute through green-hydrogen production (by electrolysis) during low demand (off-peak hours) periods to replace hydrocarbon fuel for use elsewhere.

Given the current installed capacity structure, achieving carbon neutral goals using renewable energy sources would be economically challenging. By some estimates, several trillion U.S. dollars of investment would be involved to install suitable capacity. In addition, due to intermittent power generation by renewable sources, nearly 100% redundancy by conventional energy sources would be involved in such an approach. The size of the redundant conventional capacity may be reduced through use of batteries or other energy storages. However, the widespread use of electric batteries will be extremely challenging due to limited worldwide rare-earth metal availability and the environmental impact of battery material mining, battery manufacturing, and battery disposal. Non-battery energy storages (such as LAES and CAES) on the other hand have relatively low efficiencies for stored energy recovery (≤50%) and their lifetime costs are as expensive as the electrical battery storages.

Therefore, the strategies to curb the rising $CO_2$ levels should include $CO_2$ capture and utilization from major energy and industrial sources. Good practices dictate several major criteria that such systems should meet: 1) minimum parasitic power use for $CO_2$ capture, 2) economic prudence in terms of lifetime costs vs. quantity of $CO_2$ removed, 3) environmentally safe $CO_2$ storage, and/or 4) energy efficient $CO_2$ utilization and conversion into useful energy or commodity.

Several technologies of $CO_2$ capture from power and industrial plants are currently at various stages of development and commercialization. They can be segregated into two major categories: a) front-end technologies, and b) back-end or post-Combustion technologies.

The first category of front-end technologies involves reducing parent hydrocarbon fuel to a syngas, preferably hydrogen by solid fuel gasification on-site (e.g., IGCC plants), and by steam reforming or partial oxidation of the gaseous fuels or natural gas (usually produced off-site). The produced raw syngas is typically pressurized having (besides dominant components such as $H_2$ and $CO_2$) relatively high CO, and some methane, and hazardous substances such as sulfuric compounds (e.g., $H_2S$), NOx, and other substances. Because the mass of raw syngas subjected to hazardous substances removal is substantially lower than a mass of total combustion product of an original fuel (especially when oxygen is used for gasification process), the front-end technologies have some advantages with respect to the size of equipment and power usage vs. post-combustion treatment.

To eliminate residual carbon monoxide and methane contained by raw syngas, the syngas is subjected to an endothermic water-gas-shift reaction to convert CO into a mixture of hydrogen and $CO_2$, which still contains other acidic gases (e.g., $H_2S$). Finally, this formulated syngas mixture further undergoes scrubbing of $CO_2$ and hazardous components either by chemical solvent system (e.g., methyl diethanolamine [MDEA]) or physical solvents (e.g., Rectisol or Selexol) to obtain carbon free fuel (hydrogen).

Evolving methods of $CO_2$ capture from syngas may use adsorber beds filled with materials such as Alumina, Zeolite, and Activated carbon, and gas separation using membranes constructed of polymers, ceramic, and hollow fiber. This first type of evolving method involves bed material regeneration ($CO_2$ release for sequestration) that can be achieved by Pressure or Temperature swing, or more sophisticated bed material chemical washing. Since this process is not continuous, it operates in a batch mode that involves several sets of adsorption/desorption equipment to allow continuous operation.

With respect to $CO_2$ expelled to the atmosphere, burning synthetically produced hydrogen either in gas turbines or steam-generators using air or an oxidizer including an oxygen-rich mixture, traces of $CO_2$ may be found (those that escaped the syngas scrubbing process and those present in an oxidizer, e.g., air). However, the exhaust of burned hydrogen will not be free of hazardous emissions such as nitrogen oxides (NOx) produced by a thermal mechanism of nitrogen oxidation, even though they may be present in a small quantity in the oxygen-rich oxidizer. Removal will involve any commercially available technology (e.g., selective catalytic and non-catalytic NOx removal technologies using ammonia as a NOx reducing reactant).

Parasitic power losses associated with front-end methods, in particular when applied to Integrated Gasification Combined Cycle (IGCC), reach ~10% points. This corresponds to ~25% of the useful power output loss of a modern supercritical steam power plant or a typical IGCC plant without $CO_2$ capture. Other disadvantages of this technology are complexity of design, operation under severe acid corrosion conditions, and use of materials hazardous to human health and operational safety associated with $CO_2$ scrubbing from the syngas. Similar or greater power losses are also applicable to a power plant that uses syngas produced off-site, after a power plant's net electric output is discounted by the power and/or fuel consumed during off-site syngas production, relevant $CO_2$ being emitted into atmosphere, and also by syngas handling.

As opposed to front-end technologies, back-end technologies are available in much greater variety and are typically suitable for both power and industrial application. These methods exploit two major principles to facilitate $CO_2$ capture: a) Partial or near complete removal of the ballast nitrogen present in oxidizer (air by either using enriched oxidized up to 100% Oxi-firing and chemical looping combustion that largely result in capturing $CO_2$ from a mostly binary mixture of $CO_2$ and water vapor), and b) Scrubbing flue gas generated by fossil fuel combustion in air using chemical (amines) or physical solvents (Ionic liquids—early stage of development), and chemical and physical sorbents (amine-solutions and metal organic frameworks, respectively). Back-end technologies may be an add-on system downstream of equipment usually used for conventional flue gas treatment from hazardous emissions (e.g., NOx, $SO_2$), etc.) and may lead to a substantial increase of the capital and operating costs.

100% Oxy combustion is a simple way for achieving high rates of $CO_2$ capture in terms of its concept, validated design, and construction. Most importantly it does not involve additives to capture $CO_2$ from flue gas. Burning any fuel with such oxidizer produces combustion products including mostly $CO_2$ and water vapor. Consequently, large quantities of water vapor contained by combustion products can be separated from flue gases by a simple cooling by either water or ambient air (while noncondensing $CO_2$, residual $N_2$, and other gaseous impurities) that are further are subjected to pretreatment. Then, the purified $CO_2$ stream undergoes a pressurization from a near ambient pressure to a storage pressure (e.g., up to 1100 psia if involving underground storage). Reportedly, Oxi-Fired technology does not offer significant improvements in terms of fuel efficiency (useful generation loss is ~30%), but offers up to 98% vol $CO_2$ capture rates, a more simplistic design, and reduced operation costs (reduced use of traditional additives for water and dry flue gas treatment).

The parasitic losses associated with oxygen production can be reduced by advanced integration with a power generation process in the latest technology configurations. This involves utilization of the rejected (waste) heat generated by air compressors in the air separation process to replace at least a portion of the boiler feed water preheating instead of using steam extractions from a steam turbine. Such extractions are typical for Rankine and Combined (Bryton and Rankine) power cycles and if replaced as suggested would allow more steam to be available for power generation applications.

In summary, the major disadvantages of 100% Oxi-firing are 1) high purity oxygen production with an optimum residual $N_2$ concentration around 2% to 4%; 2) high parasitic power losses even with the economic cryogenic air separation processes; and 3) relatively high parasitic power losses associated with $CO_2$ stream pressurization prior to its sequestration (from ambient to at least 1,100 psia for underground storage). The above-mentioned parasitic losses of Oxi-firing are also applicable (to a different extent) to the group b) of the post-combustion technologies listed above (e.g., pressurization involved before membrane use for $CO_2$ separation from a flue gas, gaseous $CO_2$ stream pressurization for sequestration, and other suitable techniques). Yet, other often overlooked disadvantages of this group of technologies are 1) a need for recurrent production of chemical or physical additives and correspondent $CO_2$-foot print and 2) multiple additives being used for capturing various combustion pollutants.

Emerging back-end technologies also address issues of system complexity, power consumption, and operational costs reduction to achieve near complete $CO_2$ capture. A direct fired supercritical $CO_2$ cycle or Allam Cycle ($dsCO_2$) (U.S. Pat. Nos. 10,989,113 and 11,174,759) is one such power generation technology where $CO_2$ capture is intrinsically integrated into a power process. The cycle operates on supercritical carbon dioxide (up to 300 bars or 4,350 psia), burning hydrocarbon fuel in the mixture of oxygen and the working fluid, (e.g., $CO_2$), thus producing combustion products including $CO_2$, water vapor, and appropriate concentration of oxygen excess. It is claimed that the improved fuel efficiency $dsCO_2$ may have $CO_2$ turbine exit pressure around 30 bars (~450 psia), which is below critical pressure $CO_2$. Therefore, the portion of excess working fluid in the system downstream of the turbine should be pressurized to a much greater pressure (e.g., to about 1,100 psia as required by the underground storage or up to 2,000 for deep sea storage). Due to high pressure criteria in the combustion chamber, a practical way for oxidant ($O_2$) delivery is to use the cryogenic air separation/liquefaction process, thus allowing liquid oxygen to be pumped into a combustion chamber while also assisting a cooling of a gas turbine's blades. Similarly, the fuel (either a natural gas or a syngas) derived from solid/coal gasification should also be pressurized to these high pressures. Independent studies have indicated that $dsCO_2$ integrated with coal gasification has higher fuel and $CO_2$ capture efficiency when compared to a proven Integrated Gasification Combined Cycle (IGCC). Fuel efficiency of $dsCO_2$ has been reported to reach 37% (at $CO_2$ capture rate ~98% with purity of 98%), whereas in comparison IGCC efficiency is 31% ($CO_2$ capture rate 90% with purity of 99.9%).

Both $dsCO_2$ and IGCC plants may use special reactants for acidic gas removal, for example as explained above regarding the front-end $CO_2$ removal technologies. The water produced by combustion reactions in $dsCO_2$ may be easier to remove from a pressurized working fluid leaving a turbine, for example at the turbine discharge pressures near $CO_2$ critical pressure (e.g., at pressure 74 bar or ~1100 psia) at which water vapor condenses completely at temperatures below 550° F. This allows simple water removal from working fluid by ambient air cooling followed by inertia-driven separators and/or mist elimination screens. Water vapor adsorption and/or use of any desiccant may or may not be used to remove moisture from the high purity $CO_2$ stream sent for sequestration similar to a typical compressed air station operation that uses regenerative duplex moisture adsorption.

The excess of $CO_2$ produced by combustion in $dsCO_2$ following water separation can be removed from the working fluid for sequestration. At critical or near critical $CO_2$ pressures leaving the turbine, the power used by sequestration processes will be substantially diminished. (e.g., pressurizing from ~1,100 psia to 2,500 based on EOR, see above). However, should turbine exhaust pressure go substantially lower (e.g., 450 psia or 28 bar that is claimed as an optimum discharge pressure for maximum power generation efficiency), then the power used to pressurize $CO_2$ for proper sequestration conditions would increase by an order of magnitude (~15 times for the conditions cited here).

Emerging $dsCO_2$ technology may provide a greenfield option. Potentially it may be retrofitted as a top cycle with existing steam or IGCC power plants. However, it is yet to be proven if such an arrangement can achieve appreciable economic benefits.

Another emerging technology that may compete with oxy combustion is chemical looping combustion (e.g., U.S. Pat. No. 9,683,737 and U.S. Patent Applications 20150010873 and 20230338896). This technology instead of combustion air uses oxygen contained by metal oxides, whereas metal oxides are supplied together with a fuel into a combustion chamber (furnace/reactor). There, metal oxides undergo high temperature reduction (redox reactions), thus providing most of the oxygen involved in a combustion process. The reduced metal oxides are separated from combustion products (and ash for solid fuel combustion) and supplied into a reactor where they react with ambient air, causing their oxidation. To achieve a substantially complete fuel burnout in the furnace/reactor, about ~ 15% of a total oxygen used by fuel combustion (a.k.a. "polishing oxygen") is supplied by an Air Separation Unit. The process is expected to cut parasitic losses substantially in comparison with IGCC or 100%-Oxi-firing due to reduced loads for oxygen generation and in addition would produce a cleaner $CO_2$ stream that may involve less complicated and less intense treatment before its compression for sequestration.

Applying CLC technology may potentially cut parasitic power losses of $CO_2$/Carbon Capture (CC) by half or more when compared to IGCC with carbon capture described above. Yet the associated operating costs may impede its application due to the use of expensive metal oxides such as Co, Cu, Ni, Ti, and/or other oxides, whereas the best applications (from a performance standpoint, e.g., oxygen transfer) may present substantial hazard to human life. The best oxygen transfer oxide, like gypsum ($CaSO_4$), is probably a favorable option, but would present multiple operational issues (furnace or reactor corrosion, slagging, and fouling).

This technology may use circulating fluidized bed boilers (operating principles), but may significantly alter combustion equipment design (e.g., thus may have reduced suitability as a retrofit option). Such issues are typical for the majority of front-end technologies (except oxy combustion), which may be relatively more intrusive and may therefore better suit greenfield projects.

In contrast, post-combustion technologies may provide a relatively less intrusive add-on option that may work for both greenfield and retrofit options. However, challenges with these technologies may include low $CO_2$ concentration in combustion products (for gas turbine and steam power plants, the range is 4% to 13% at the point of $CO_2$ collection) and thus treat larger gas volumes that in turn incurs larger parasitic power. Accordingly, post-combustion technologies may result in relatively low fuel utilization efficiency of a power plant or relatively low overall industrial process efficiency and profitability.

According to DOE published data on commercially available back-end technologies, the penalty associated with $CO_2$ capture and sequestration is about 30% of the useful power output (regardless of type of power generation facility or technology). Accordingly, to maintain the same power generation of fossil power to sustain an adequate electrical power supply, electric grid stability and resiliency would call for a ~30% increase in installed fossil power capacity (e.g., ~30% or more fossil fuel consumption and $CO_2$ emissions to be captured).

A standalone class of gas separation is cryogenic fractionation that is better suited for front-end, pre-combustion than for post-combustion applications. This cryogenic method is commercially used to separate $CO_2$ from a mixture of gases (e.g., natural gas purification). Cryogenic separation is currently used to separate $CO_2$ from a gas stream with a high concentration of $CO_2$ (usually more than 50%). According to experts, this technique may not be economical for removal of $CO_2$ from exhaust gas leaving coal- or natural gas-fired plants because of low $CO_2$ concentrations in these streams (and significant parasitic power criteria to bring such high-volume streams to a subzero temperature). The cryogenic fractioning involves a gas mixture being compressed and cooled in several stages to a negative temperature (to bring to a temperature corresponding to phase changes of $CO_2$ and other impurities, e.g., $H_2S$, and other constituents may be present in said mixture). Subject to operating conditions, the $CO_2$ can come out as a liquid or solid together with other components from which it can be readily recovered.

The major benefit of cryogenic capture of $CO_2$ is that no chemical sorbent is used and that the process can be carried out at atmospheric pressure. Cryogenic capture also reduces the operating costs of sequestration because the liquefied $CO_2$ is an energy efficient way of its compression to a high pressure for $CO_2$ storage and transportation via pipelines. A major shortcoming of this process is the use of a source of cryogenic energy that may be provided by either air separation unit or by external liquid nitrogen and/or oxygen supply. While the latter may be a viable option for the industrial application, for both power and industrial applications such a method would use either a high external power supply or increased parasitic power consumption, and/or purchasing and operating complex equipment. Life-cycle cost analysis of cryogenic systems shows marginal improvements in the efficacy of the $CO_2$ removal and power requirements for $CO_2$ sequestration.

In summary, major challenges to capture $CO_2$ from the effluent products of either power generation or industrial applications are: Diluting concentrations $CO_2$ (typically 4% to 15% by volume) and thus a large volume of gas is to be treated; $CO_2$ is collected at low pressure (slightly above atmospheric), thus involving significant electrical power to bring large volumes to sequestration, pipeline transportation, or storage conditions (about 2,000 psia); and large equipment and associated parasitic power required to remove trace impurities (e.g., particulate matter, sulfur dioxide [$SO_2$], other acidic components, and/or nitrogen oxides [$NO_2$]) present in the flue gas that degrades capabilities of sorbents, adsorbent, and/or membranes (etc.) to capture $CO_2$. Additional major challenges are: operational safety and economics of operation that involve avoidance or minimization of hazardous solvent and adsorbent/membrane material use, and recurrent expenses for regeneration and/or replacement of expensive solvents (materials); and technologies that use solvents and/or adsorbents and their periodic regeneration (replacement), which are sources of secondary atmosphere pollution with $CO_2$ and other greenhouse emissions associated with their production and transportation (which is why avoiding their use would benefit overall $CO_2$ emissions nationwide).

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to method. The method includes directing a stream into a compressor station, the stream being a pre-cooled effluent gaseous stream including $N_2$, $O_2$, $CO_2$, water vapor, and hazardous emissions when it is directed into the compressor station, bringing the stream to a medium range pressure by performing an isothermal compression using the compressor station, and sending the stream into a first regenerative heat exchanger, at which a temperature of the stream is lowered to below a condensation temperature of $CO_2$ and causing its liquefaction thereby transitioning or transforming the incoming stream into a two-phase stream. The method also includes directing the two-phase flow into one or more inertia separators to collect said liquid phase including $CO_2$ in a pressurized storage, directing a gaseous portion of a two-phase stream that leaves the one or more inertia separators into an expander, the stream being a high pressure, low temperature purified stream when leaving the one or more inertia separators, and directing an effluent stream from the expander to the first regenerative heat exchanger, the effluent stream being subcooled to near-cryogenic temperature, free of the $CO_2$ and the hazardous emissions to provide the source of cold energy to achieve deep cooling of the stream directed into the first regenerative heat exchanger. The temperature of the stream is lowered at the first regenerative heat exchanger by the effluent stream from the expander.

In another aspect, the present disclosure is directed to a system. The system includes a compressor station having an intercooler and an aftercooler, a regenerative heat exchanger disposed upstream of the compressor station, an expander, a common shaft connecting the compressor station to the expander and to a motor to provide a balance of input power to suit the operation of the system, and a plurality of additional regenerative heat exchangers that are configured to exchange hot and cold energies produced by compression and expansion of streams within the system to at least in part compensate energy used to condense or liquefy impurities held by a contaminated stream. The plurality of additional regenerative heat exchangers are interconnected with the compressor station and the expander.

DETAILED DESCRIPTION AND INDUSTRIAL APPLICABILITY

Figure 1:
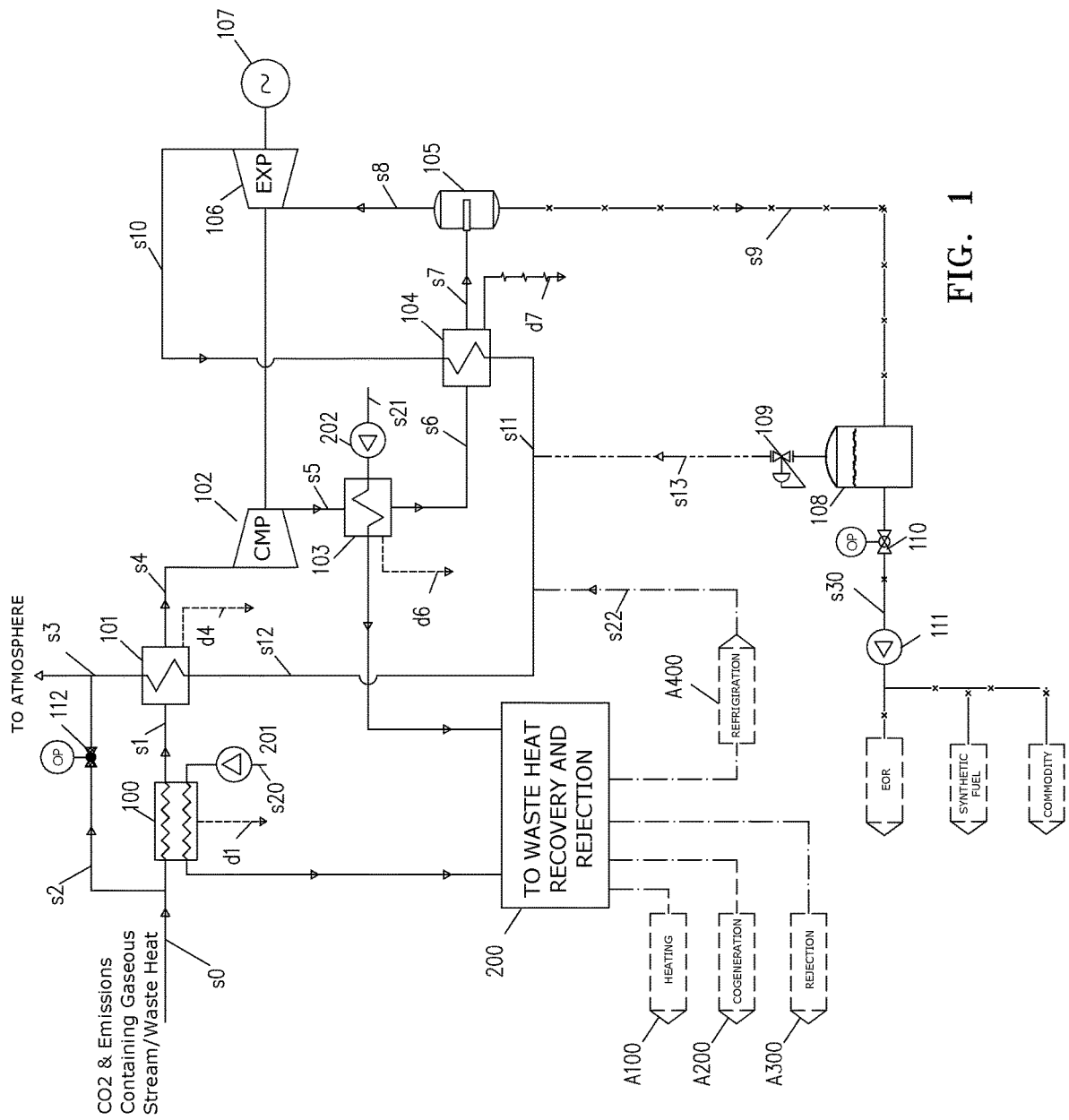
FIG. 1 illustrates a schematic view of an exemplary embodiment of the present invention (e.g., an exemplary process diagram as described in the present disclosure, for example a Principal Arrangement of the Regenerative Cooling as a method to remove $CO_2$, Water Vapor, and/or hazardous emissions loaded flue-gas stream leaving a power or industrial plant)

The exemplary disclosed system, apparatus, and method may be used to capture multi-pollutants from polluted gases. The exemplary disclosed system, apparatus, and method may be a method, design, and Application for carbon dioxide, water vapor, and/or hazardous emissions capture from polluted gases.

In at least some exemplary embodiments, the exemplary disclosed system, apparatus, and method may include an effective collection method for $CO_2$, water vapor, and other hazardous emissions from an effluent gas stream leaving power plants, boilers, industrial plants, or other facilities that may reduce (e.g., minimize) parasitic electrical power consumption. The exemplary disclosed method may be based on physical properties of $CO_2$ and other pollutants to liquefy at low temperatures and pressures equal to or greater than ambient pressure after applying a cooling media (e.g., generated within the proposed process) that may use the exemplary disclosed sequence of external and regenerative cooling, pressurization, and expansion. The exemplary disclosed method may then expel a $CO_2$-Water Vapor-Emissions-free stream to atmosphere while a significant portion of undesired pollutants and/or greenhouse gases undergo transition into their correspondent liquid states and the remaining ones may be bound by the condensate of the water vapor present in the effluent gas. In addition to offering a process (e.g., a singular process) and reduction of power for collection and sequestration of some or substantially all emissions (e.g., major emissions), the exemplary disclosed method may also offset $CO_2$ emissions generation elsewhere by avoiding fuel use for production of additives typically used for emissions control (e.g., ammonia, Lime, activated carbon, and/or other additives) and also based on reuse/resale of substances captured individually from the polluted effluent gas such as NO, $NO_2$, $SO_2$, and/or other captures substances.

In at least some exemplary embodiments, the exemplary disclosed system and method may be for collection of carbon dioxide, water vapor, and other regulated hazardous emissions in their liquid states (e.g., a suitable state for treatment, transportation, and/or storage), and may be applicable for industrial and power plants and/or large fossil fuel fired boilers. The exemplary disclosed sequence of external and regenerative cooling, pressurization, and expansion of the effluent streams may be provided (e.g., rationalized) to reduce (e.g., substantially minimize) parasitic power losses while increasing (e.g., substantially maximizing) emissions capture when compared to competing or emerging technologies. The exemplary disclosed method may be suitable for green field and/or retrofit (e.g., brown field) projects with insignificant alterations (e.g., minimal or substantially no alterations) to an existing plant, which may differentiate the exemplary disclosed system, apparatus, and method from competing $CO_2$ capture technologies.

In one exemplary aspect, the present disclosure may be directed to method. The method provides steps to fractionate and then remove any impurities present in a gaseous stream resulting from combustion of a hydrocarbon fuel or any other contaminated gaseous exhausted into the atmosphere containing carbon dioxide, water vapor, nitrogen, and/or other hazardous impurities (NOx, SOx, HF, Hg, $NH_3$, and/or other impurities) by subjecting such a stream to a multistage external and regenerative cooling, as well as to at least one pressurization step and at least one following expansion. The initial cooling of a said stream may take several steps at both near ambient and pressurized states that provides a relatively high degree of dehydration along with partial removal of hazardous components having high condensation temperatures (e.g., $H_2SO_3$/$H_2SO_4$ and/or similar components) after its thermal energy is absorbed by an external coolant (e.g., water, ambient air, or any other suitable origin coolant, for example natural or manmade that may be designated as a working fluid that recovers waste heat either to contribute its heat to a main process such as power generation or for electric power/cold energy cogeneration, e.g., Kalina cycle, Absorption chiller, etc.). Then cooled stream may be further submitted to a secondary, regenerative deep cooling by partially depressurized stream free of $CO_2$-Moisture-Emissions generated downstream within the proposed process. This regenerative deep cooling may cause substantially complete fractionation/liquefication of impurities such as $NO_2$, $SO_2$, Hg, and/or $NH_3$, and a majority of the water vapor whereas $CO_2$-Moisture-Emissions-free products after absorbing heat of the contaminated stream are released to the atmosphere at ambient or slightly higher temperatures.

Following the regenerative stage of the deep cooling, the $CO_2$ loaded stream with traces of hazardous emissions and traces of water vapor may be submitted to pressurization by a compressor downstream of which the excess of thermal energy may be absorbed by another external stream of a working fluid (e.g., either of the same or different origin as used for initial cooling and that may in the similar manner also contribute its energy to a power plant generation process or power/cold energy cogeneration suitable for either industrial or power applications). This purified and cooled pressurized stream that may predominantly include $N_2$, $O_2$, and $CO_2$ may be further submitted to a regenerative cooling process. In the regenerative cooling process, it may undergo $CO_2$ fractionation by giving up its internal energy (e.g., both sensible and latent thermal energy) to the cold $CO_2$-Moisture-Emissions-free stream after its polytropic expansion/cooling, thus attaining a near cryogenic temperature level, while/thus compensating at least a portion of power used by the disclosed process. The method may thereby simplify the collection of substantially all impurities from the initial contaminated gaseous stream without any additives based on fractionation/liquefaction followed by mechanical separation from a two-phase stream.

In another exemplary aspect, the present disclosure may be directed to a system. The system includes at least one compressor and one expander that may be mechanically connected by a common shaft driven by an electrical or other type of a drive, at least two heat exchangers hydraulically connected to an external cooling media, and at least two regenerative heat exchangers connected hydraulically to a cold/refrigerant stream produced internally by the expansion of the $CO_2$-Moisture-Emissions-free gaseous stream. Energy collected by the two external cooling media may be hydraulically connected to a prime mover to produce supplemental power, or alternatively may contribute its energy to a main technological process or be used to produce additional cold energy in the adsorption chillers to supplement cooling loads used in the method. The heat exchangers may be equipped with components for two-phase (gas-liquid) flow separation (e.g., either internal or external, designed per suitable practices). Separated contaminants may be collected in either individual or common storage for hazardous emissions, and/or a separate high and medium pressure liquid $CO_2$ storage. Storages may be equipped with components for safe transfer of the collected emissions in a liquid state for transportation by trucks (e.g., for hazardous emissions), via pipeline for $CO_2$ sequestration after pressurization above supercritical pressure (e.g., $CO_2$ for EOR), and/or any other suitable transportation method.

At least some exemplary embodiments of the presented disclosure may be directed to a regenerative cooling system for removing contaminants, water vapor, and $CO_2$ present in a mixture of inert and hazardous gases leaving power or industrial plants based on their individual fractionation. The exemplary disclosed system and apparatus may realize a singular non-cryogenic, self-generating (e.g., regenerative) cold energy method that may utilize both externally and internally generated electric power to produce near zero emissions and a dry exhaust stream that may be expelled to the atmosphere after thermal treatment of the contaminated mixture of gases containing hazardous emissions, water vapor, and $CO_2$.

FIG. 1 illustrates an exemplary embodiment of the exemplary disclosed system, apparatus, and method, including an exemplary sequence of operation for removing hazardous emissions and $CO_2$ fractionation. As illustrated in FIG. 1, stream s0 containing $CO_2$, water vapor, and emissions produced by burning fuel in a fossil power plant, or in an industrial furnace, or by any technological process having temperature appreciably greater than ambient temperature is admitted into a first cooler 100, where with the help of external coolant stream s20 supplied by a motive device 201 (e.g., whereas the coolant is either naturally available water or air, or manmade coolants such as a mixture of water and ammonia used by Kalina power cycle, or any working fluid used by an organic Rankine power cycle for low temperature waste heat recovery) allows capture of the waste heat energy from said emissions contaminated stream. A box 200 represents an array of available engineering solutions to utilize the collected waste heat such as, for example, supplementing the regenerative water heating in a steam power cycle or for space heating (A100), for power cogeneration (A200) to reduce power consumption of the exemplary system, and/or refrigeration (A400) to supplement cooling loads used by the exemplary system. Because technological processes cannot recover all waste heat, extra energy may be rejected to the environment (A300). Box 200, A100, A200, A300, and A400 may encompass any suitable equipment and/or components for utilizing waste heat (e.g., heater components, power cogeneration components, refrigeration components, and/or any other suitable components).

The parameters of stream s0 and its composition may vary depending on the process nature, therefore, depending on a rate of an external cooling in heat exchanger 100 (e.g., the $CO_2$-Moisture-Emissions loaded stream s0 may undergo full or partial condensation of sulfuric acid and water vapor should the latter two be present in the stream). This condensed flow or drain is schematically depicted as stream d1.

Downstream of cooler 100, a further cooling of the $CO_2$-Moisture-Emissions loaded stream s1 may take place in a regenerative cooler 101 by a coolant stream s12. Depending on applications and chosen solutions, cooler 101 may include cooling sections that may be cooled by different coolants, including cold regenerative streams s11 and s13 connected to one cooling section, and by stream s22 connected to the second cooling section. The degree of cooling attainable in cooler 101 may allow removal of water vapor from effluent stream s4 to ~1% by volume or less. An acidic stream of water vapor condensate d4 (e.g., that may have traces of sulfuric, nitric, carbonic acids, and/or other components) may be removed for a typical pH stabilization (e.g., neutralization) and filtration of the resulting sediments before it can be reused in a technological process (e.g., for which the exemplary system is incorporated into for example as disclosed herein) and/or be disposed into environment.

Stream s4 (e.g., partially purified from hazardous emissions and having low moisture content) may then be subjected to pressurization in a compressor 102 to a medium pressure range of 7 to 20 bars (about 100 to 300 psia), whereas the heat gained by a stream s5 during pressurization may be absorbed in the cooler 103 by an external coolant stream s21 having ambient temperature and supplied by a mover 202. Because stream s5 may enter cooler 103 at elevated pressure, the majority of the residual water vapor condenses there while also partially absorbing some hazardous emissions and $CO_2$, thus forming a liquid acidic stream d6 that may be removed and treated similarly to stream d4 as described above. The effluent gaseous cooled/pressurized stream s6 may enter a final, multi-emissions condenser 104 that may be cooled by a $CO_2$-Moisture-Emissions-free stream s10 having near cryogenic temperature after being polytropically expanded in a prime mover (e.g., expander) 106. The amount of cold energy in stream s10 may be sufficient to provide a gradual cooling of stream s6 and fractionation (latent heat absorption) of individual hazardous emissions such as $NO_2$, HF, $SO_2$, $H_2SO_4$, $NH_3$, Hg, and/or other emissions that may be removed (separated) at multiple points individually (e.g., for clarity shown as a single stream d7 hydraulically connected to condenser 104).

At the exit of emissions condenser 104, the conditions for a complete or near-complete $CO_2$ condensation may be reached. Should the sequence of operation as described in this exemplary embodiment be followed, then it may produce a two-phase stream s7 primarily including $N_2$, $O_2$ in the gas phase and $CO_2$ in the liquid phase. Stream s7 may then be submitted for mechanical separation in a typical liquid-gas separator 105 (e.g., one or a combination of suitable separation methods may be applied). Then, a substantially $CO_2$-free gaseous stream s8 may be directed to expander 106, and a high purity liquid $CO_2$ stream s9 may be sent to a pressurized, short-term storage 108. Due to internal evaporation within storage 108, an excess of pressure may be relieved using stream (e.g., line) s13. A back-pressure regulator 109 may be connected to regenerative coolant stream s11 (e.g., as shown) by stream (e.g., line) s13 or alternatively to incoming regenerative coolant stream s10. For example, in both cases, the $CO_2$ evaporated from the temporary storage 108 may provide a cold energy credit after being depressurized in back-pressure regulator 109. Additional cooling/refrigeration credits to the system may be provided by absorption chiller A400 that may utilize waste heat from both main technological process (power generation or industrial) and/or internally generated by compressor 102 to provide a supplemental, deeper cooling of flue gas stream s1 by regenerative coolant stream in heat exchanger (cooler) 101. In such a way, the lower temperature and mass flue gas (e.g., stream s4 vs. stream s1), due to moisture condensation (stream d4), may reduce the work of compressor 102 and cooling load used by heat exchanger (cooler) 103. After preheating in heat exchanger (cooler) 101, the $CO_2$-Moisture-Emissions free stream s3 may be released to the atmosphere, whereas some traces of $CO_2$ that may be present there (e.g., which may be the subject of temporary storage 108 operation). A power source such as an electric motor 107 may supplement energy produced by expander 106 to satisfy total power criteria (e.g., usage) by the described process and/or by the exemplary disclosed main technological process. A system bypass stream s2 equipped with an isolation (e.g., normally closed damper 112) may be provided for suitable system maintenance and to facilitate operating conditions during power or industrial plant start-ups.

As described above, the exemplary disclosed system may provide for an effective removal and collection of hazardous emissions, $CO_2$, and/or moisture contained by power or industrial plants exhausts. The exemplary disclosed system may also replace several emissions control processes with a single method that uses no additive production (e.g., additive production that is responsible for secondary atmosphere contamination with hazardous emissions and $CO_2$ release elsewhere).

Figure 2:
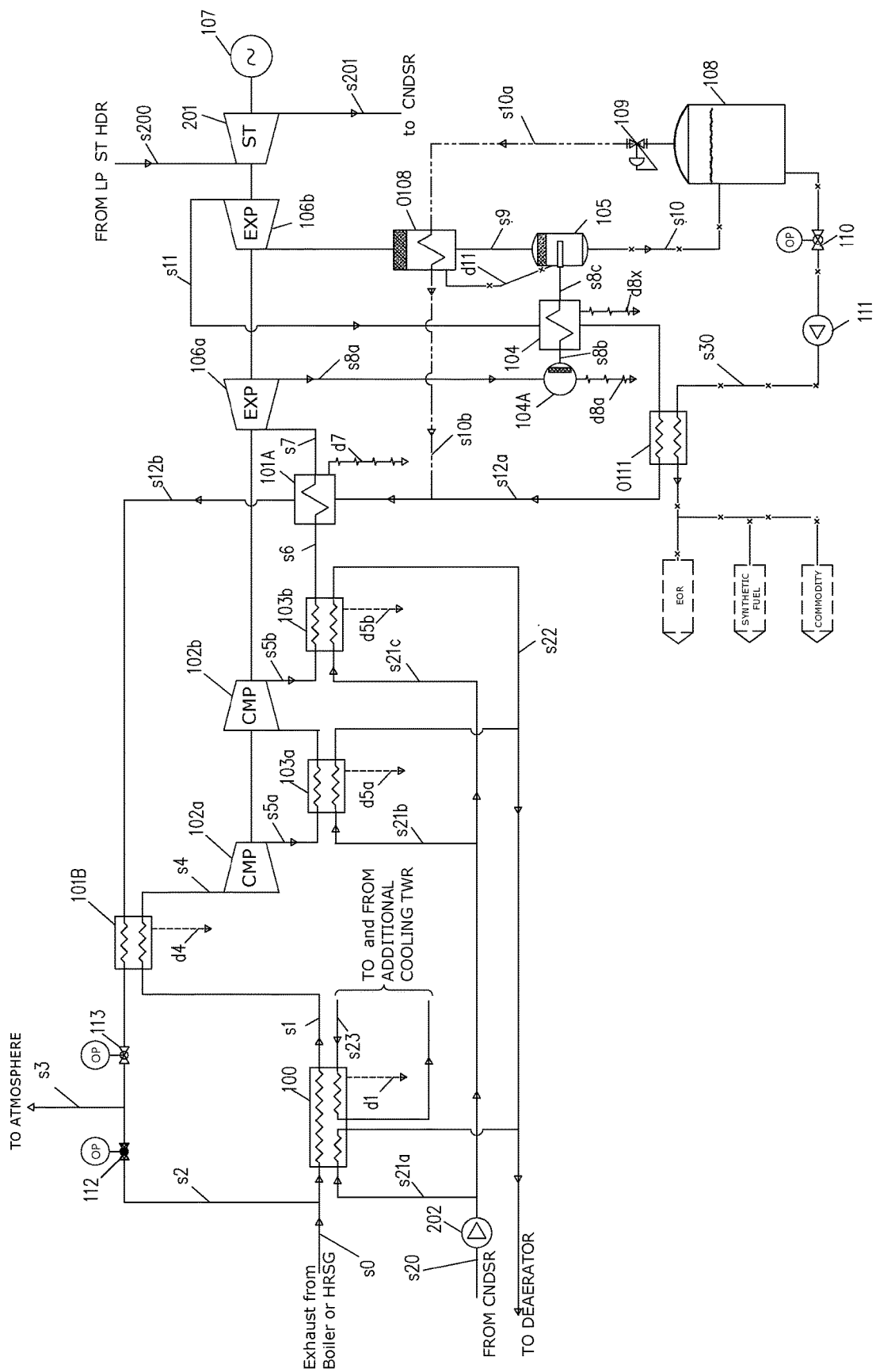
FIG. 2 illustrates a schematic view of another exemplary embodiment of the present invention (e.g., for integration with Steam Rankine and Combined Cycles Plants)

FIG. 2 illustrates another exemplary embodiment of the exemplary disclosed system, apparatus, and method. For example, the exemplary disclosed system may be integrated with Rankine steam or Brayton-Rankine combined cycle. Stream s0 as above represents a technically clean of dust $CO_2$-Water Vapor-Emissions loaded stream that may be directed for cooling in heat exchanger 100 by external media. There may be two different sources/streams, one of which (e.g., stream s21a) may be a portion of feed water taken from condenser (e.g., stream s20, for example a working fluid condensate collected after its expansion in a steam turbine), and a second one (e.g., stream s23) may be a technical grade, circulating water (e.g., hydraulically connected to a cooling tower to reject to atmosphere the heat absorbed from stream s0 in the low temperature section of heat exchanger 100). The rate of stream s21a may be adjusted to maintain an outlet stream temperature that may closely match or somewhat exceed the normal operating temperature in a deaerator (e.g., to scavenge any dissolved oxygen that may be present in the heated feed water before it enters a Boiler/HRSG in the power cycle). Stream s0, after cooling in heat exchanger 100, may have some portion of water vapor and/or sulfuric compounds (e.g., if present) condensed and then removed for treatment via drain d1 thus forming stream s1. Stream s1, after leaving heat exchanger 100, may enter the last stage of a regenerative cooler 101B, where it may be cooled by a low temperature $CO_2$-Moisture-Emissions-free stream s12b generated downstream within the disclosed system. This may cause a substantial residual water vapor condensation with (e.g., alone with) carbonic ($H_2CO_3$) and nitric ($HNO_3$) acids and may include acids of Chlorides and/or sulfuric substances (e.g., if present) following their adsorption by, and reaction with, the said water vapor condensate contained by stream s1. This mixture (e.g., highly acidic liquid mixture) may be collectively expelled by mechanical separation via drain d4 forming stream s4 that may be substantially (e.g., essentially) purified of acidic components. Based on its sub-cooling in cooler 101B below ambient temperature and mass of stream s4 reduction vs. stream s1, the compression power usage by downstream compressors 102a and 102b may be substantially reduced. In order to further minimize power consumption by the system described herein, stream s4 may be subjected to a compression at (e.g., with intercooling applied therein) at least two stages (e.g., compressors) 102a and 102b as shown (e.g., or more stages if desired or economically suitable). An intercooling heat exchanger 103a and an aftercooling heat exchanger 103b may be cooled by the remaining feed water leaving power plant's steam condenser (e.g., by the portion of stream s20 represented by streams s21b and s21c, providing sufficient heat credit to a stream s22 as suitable for a typical deaerator operation in either Rankine or Combined cycle, thus to a great extent or completely eliminating feed water preheat by the steam extractions from a low-pressure steam turbine in said power cycles). Then, in case a fuel flow to a power cycle remains the same (e.g., not adjusted for new turbine/stream condenser operating conditions), the excess of stream s200 (e.g., steam), either in part or in total (e.g., depending on existing condenser cooling capabilities), may be diverted to an additional steam turbine 201 that may produce mechanical work that supplements power criteria for the exemplary disclosed process. The expanded low-pressure steam (e.g., stream s201) may be directed into an additional steam condenser (not shown) operating at vacuum discharge pressure with cooling provided by an additional cooling tower. Alternatively, steam turbine 201 can be of a back-pressure design if any local thermal duties exist (e.g., space heating) and/or may be used to operate a steam heated absorption chiller as disclosed above by the configuration shown in FIG. 1.

Cooling of $CO_2$-Residual Moisture-Emissions loaded streams s5a and s5b in heat exchangers 103a and 103b at elevated pressure may achieve a substantially complete (e.g., a near complete) condensation of residual water vapor and hazardous emissions (e.g., such as $NO_2$, $SO_2$, and/or other emissions) that can be satisfied by external cooling (e.g., using the feed water from a condenser, for example by streams s21b and s21c). Such condensation may also be accompanied by an absorption of some hazardous emissions and possibly some minor part of $CO_2$ producing acidic streams that are removed through drains d5a and d5b. These acidic streams may be directed to any suitable location such as any suitable water treatment plant, where they may combine with the rest of acidic condensate d1 and d4 to undergo neutralization/pH stabilization and filtration of sediments generated before this purified condensate can be reused within the power plant and/or within the disclosed process, or may be released to the environment (e.g., thereby avoiding the loss of water vapor to the atmosphere that would otherwise contribute to greenhouse gases emissions).

Figure 4:
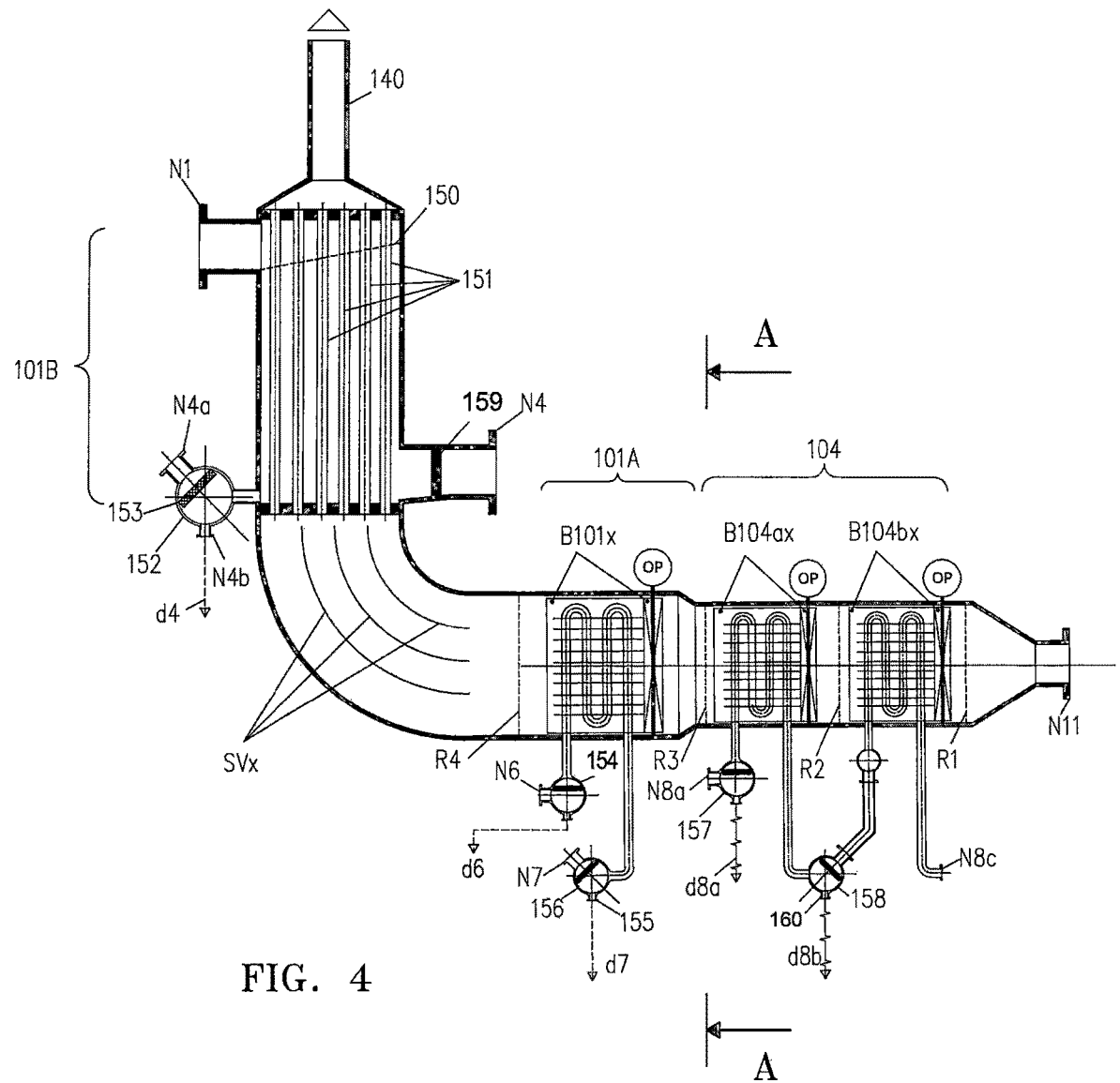
FIG. 4 illustrates a cross-sectional view of an exemplary embodiment of the present invention (e.g., a Regenerative Condensation and/or Fractionation Heat Exchanger Design for $CO_2$, Residual Water Vapor, and/or Hazardous Emissions Removal from a Process Gases and/or from a Process Exhaust)

A dried and pressurized stream s6 after leaving aftercooler 103b may be further submitted to a deeper cooling in a first stage of a regenerative cooler (e.g., heat exchanger 101A), in which residual moisture and $NH_3$ and Hg (e.g., substantially all residual moisture and $NH_3$ and Hg) present may undergo condensation and may be removed through a drain d7 in a form of a pressurized mixture. A resultant gaseous stream s7 including primarily $N_2$, $O_2$, $CO_2$, and/or traces of NO emission may be supplied to an expander 106a for a partial expansion to generate a certain percentage of work used for the disclosed process while producing a reduced temperature stream s8a. Thermodynamic c parameters of this flow may correspond to fractionation/liquefaction of impurities such as residual mercury (Hg), hydrogen sulfide ($H_2S$) if any, and/or other impurities that may be separated in a separator 104A and disposed through a drain d8a before entering a regenerative cooler (heat exchanger) 104, where stream s8b may undergo a gradual cooling by a near cryogenic stream s11 produced by expansion of a $CO_2$-Moisture-Emissions-Free stream in a downstream expander 106b. Cold energy delivered by stream s11 may be sufficient to condense (e.g., fractionate) major pollutants such as NO and $CO_2$ (e.g., but first NO may be removed through a drain d8x from the heat exchanger 104. More detailed information on technical realization of moisture and emissions fractionation is illustrated in FIG. 4 and described further below.

A two-phase flow s8c including primarily liquid $CO_2$ and gaseous $N_2$ and $O_2$ may be submitted to a gas-liquid separator 105 having a mist eliminator (e.g., an internally-built mist eliminator that is illustrated by a hatched rectangle in FIG. 2), from where a pressurized gas phase stream s9 may be sent into expander 106b, and a pressurized liquid stream s10 of liquid $CO_2$ that may be collected in a temporary storage 108. A liquified $CO_2$ stream s30 may hold substantial cold energy after passing an operating valve 110 (e.g., as also illustrated in FIG. 1). Pressurization by a liquid pump 111 to a higher pressure (e.g., up to 2500 psia if used for EOR) may be used for a supplemental regenerative cooling of streams s12a in a heat exchanger O111 or stream s12b (the latter is not shown) before sending a supercritical stream of $CO_2$ for any desired manner of sequestering and/or utilization. The additional cooling by stream s30 of stream s12a may enhance cooling capabilities of the first stage of regenerative cooling in the regenerative cooler (heat exchanger) 101A and may enhance condensing capabilities of the process. Alternatively, providing additional cooling to stream s12b may augment cooling capabilities of the second stage regenerative cooling in heat exchanger 101B, thereby reducing (e.g., minimizing) power used for compression in the first stage of compressor 102a.

Temporary storage 108 may be built to suitable engineering practices (e.g., double wall, vacuum, and/or advanced external insulation). The liquid $CO_2$ stored in temporary storage 108 may be subject to some degree of evaporation due to heat transferred from surroundings. Should any excess of $CO_2$ vapor pressure in temporary storage 108 become an issue, a pressure reducing valve 109 may open, releasing a small portion of $CO_2$ (e.g., a small portion relative to the mass of $CO_2$ captured, e.g., stream s10a).

Depending on the application, stream s10a of low-pressure $CO_2$ may be either intermittent or continuous, and if desired may be used in a heat exchanger O108 to provide an additional protection from $CO_2$ mist carryover and/or ice build-up before expander 106b (e.g., which may affect the longevity of expander 106b, assuming that typical carryover should not exceed 50 ppm). A stream s10b exiting heat exchanger O108 as illustrated in FIG. 2 may contribute to the cooling capabilities provided in the heat exchanger 101A. Any additional condensation of $CO_2$ in heat exchanger O108 may be drained back into gas-liquid separator 105 via a drain d11.

Similarly to as described above, a motor (e.g., an electric motor 107) may provide supplemental power for use by the disclosed process, in addition to the power generated by expanders 106a and 106b and steam turbine 201. Steam turbine 201 as described above may use the surplus of steam resulting from the integration of the exemplary process and/or system with an existing power plant and/or process.

A system bypass stream s2 equipped with an isolation (e.g., damper 112 and damper 113) may be provided for suitable system maintenance and to facilitate operating conditions during power or industrial plant startups.

Figure 3:
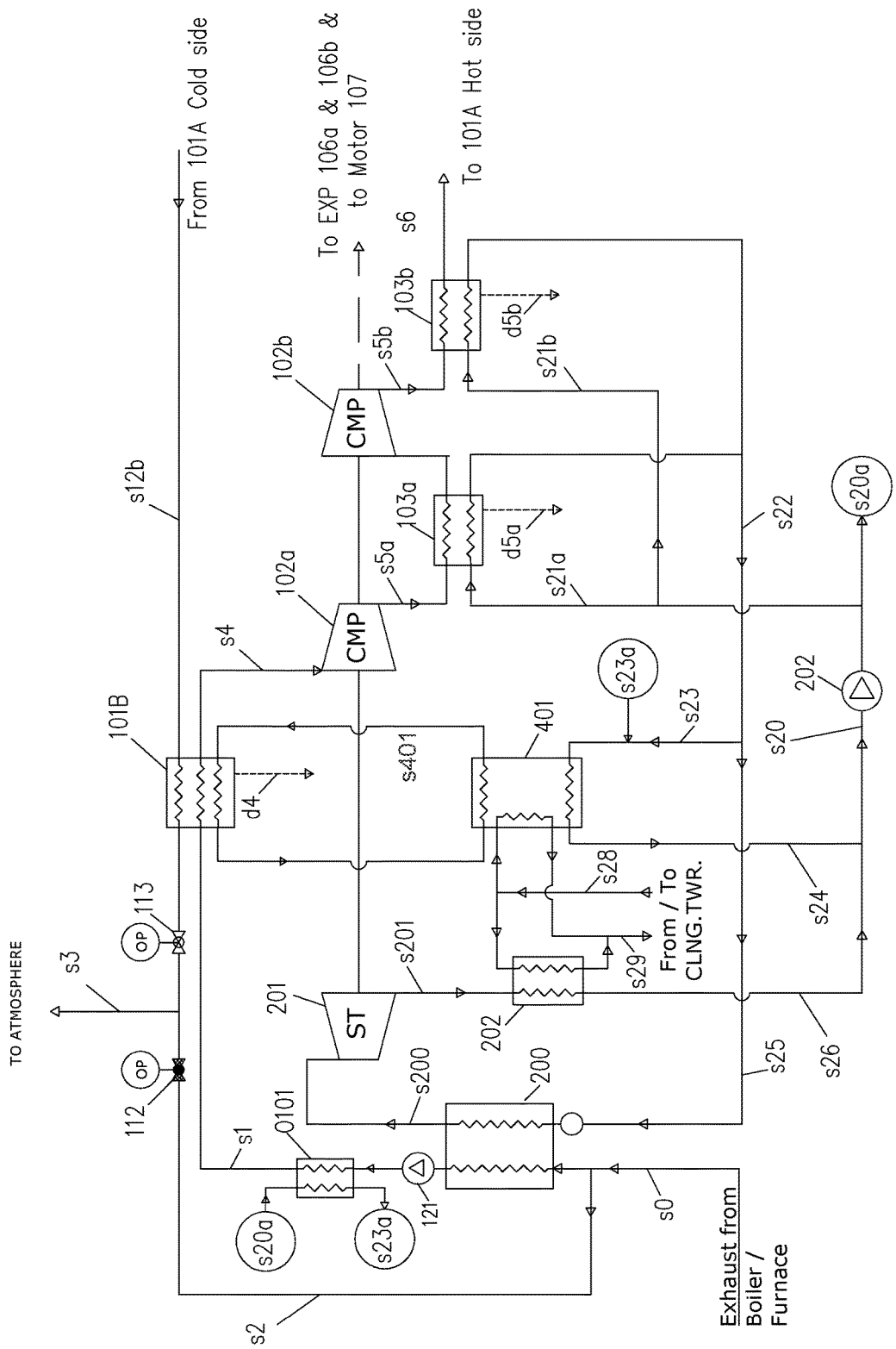
FIG. 3 illustrates a schematic view of another exemplary embodiment of the present invention (e.g., for integration with Steam Rankine and/or industrial Plants)

The use of the exemplary disclosed method of emissions and $CO_2$ capture for industrial plants may be generally similar to the exemplary power applications explained above in terms of general principles of emissions and $CO_2$ capture (though there may be variation regarding waste heat recovery). FIG. 3 illustrates an exemplary embodiment for integration into industrial applications of the exemplary disclosed system, apparatus, and method. Similar to as described above, stream s0 may represent a stream (e.g., a technically clean of dust, $CO_2$-Water Vapor-Emissions loaded stream) that may be expelled by an industrial plant. Industrial plants using the exemplary embodiment of FIG. 3 may be identified (e.g., categorized or segregated) based on exhaust temperature level. The exemplary disclosed system, apparatus, and method described herein may be used for substantially all types of temperature levels. The exemplary disclosed system, apparatus, and method may be used for high (e.g., T>900° F.), medium (e.g., T≤900° F.), and/or low (e.g., T<150° F.) temperature levels of exhaust temperature. For example, the exemplary embodiment illustrated in FIG. 3 may be used for high and/or upper ranges of medium-temperature stream s0.

In at least some exemplary embodiments and as illustrated in FIG. 3, stream s0 may be directed into a heat exchanger 200 (e.g., Boiler/HRSG), to generate water steam that may be directed into a steam turbine 201 from where a low pressure stream s201 (e.g., steam) may be discharged into a condenser 202 that may be cooled by a portion of a circulating water stream s28 supplied from any suitable source (e.g., a cooling tower). The remaining circulating cooling water may be used to satisfy the cooling duty of an adsorption chiller 401. The adsorption chiller 401 may operate on a waste heat held by a stream s23 that may include a portion of waste heat picked up by a cooling water stream s22 (e.g., used for intercooling of flue gas streams s5a and s5b after compression in compressors 102a and 102b) by absorbing the heat in heat exchangers 103a and 103b. Drains d5a and d5b may dispose of water vapor condensate and emissions similarly to as described above regarding FIG. 2. The quantity of the cooling water produced by cooling the compressed flows s5a and s5b may be suitable (e.g., sufficient) to feed heat exchanger 200 (e.g., Boiler/HRSG) via stream s25.

A stream s1 may leave heat exchanger (e.g., boiler/HRSR) 200 with temperature of about 300° F. and may be sent for cooling in an optional cooler O101 cooled by a circulating water s20a (e.g., and then combining a hot water stream s23a with hot water stream s23, thereby increasing ability of adsorption chiller 401 to provide cold energy for flue gas cooling). Alternatively (e.g., in small applications), the exhaust stream leaving heat exchanger (e.g., Boiler/HRSG) 200 may be directed into an additional heating loop of adsorption chiller 401.

Stream s1 may be sent to a heat exchanger 101B, in which besides being cooled by a $CO_2$-Moisture-Emissions free cold stream s12b leaving a cold side of a heat exchanger 101A (not shown for clarity; may be similar to as described above regarding FIG. 2), may also be cooled by an adsorption chiller cold water stream s401.

After stream s1 may give up both sensible and latent heat of major condensable components (e.g., water vapor, $NO_2$, and/or other components), in heat exchanger 101B it may relieve liquid components through a drain d4, whereas stream s4 (e.g., largely dry stream) may be further subjected to compression in at least one (e.g., two) stage compressor (e.g., stage compressors 102a and 102b). The power generated by steam turbine 201 and expanders 106a and 106b (e.g., as illustrated in FIG. 2) may offset total external power used by the exemplary process, for example reducing (e.g., minimizing) the external power use supplied to motor (e.g., electric motor 107 for example as described above in FIG. 2). The exemplary embodiment illustrated in FIG. 3 may include some of the same components as illustrated in FIGS. 1 and 2, as well as including similar components to those components for example as illustrated in FIG. 3 (e.g., prime mover 121, stream 24, stream 26, and stream 29).

In the case of a relatively lower range of exhaust temperatures from an industrial plant, the cooling of exhaust stream s0 in the Boiler/HRSG by water stream s25 may be replaced by either organic liquids or a mixture of water and ammonia used correspondingly by Organic Rankine or Kalina cycles, respectively, to generate the supplemental power used by the exemplary disclosed process to minimize external power consumption by motor 107 (e.g., similar to as described above regarding FIG. 1 and FIG. 2). Similarly, for low-temperature exhaust stream s0, its waste heat may be used directly together with the waste heat from compressors 102a and 102b absorbed by a water stream to provide heat used by an operation of one or more adsorption chillers 401 or by preheating water in heat exchanger O101 (e.g., to increase cooling capabilities of heat exchanger 101B.

The exemplary disclosed process may involve attention paid to reduction (e.g., minimization) of pressure losses (e.g., power consumption) on both emissions, including the loaded hot side or sides of the exemplary disclosed heat exchanger and also the $CO_2$-Moisture-Emissions-free stream on the cold side or sides to provide suitable (e.g., optimize, for example, minimize) parasitic power use.

FIG. 4 illustrates an exemplary embodiment of an array of the exemplary disclosed regenerative heat exchanger/coolers disclosed above. The connections (e.g., nozzles) in the heat exchangers as described below use nozzle numerations that are derived from the associated stream numbers described above that are connected to a given nozzle. FIG. 4 can accordingly be considered together with FIG. 2 and FIG. 3.

After cooling in the external heat exchanger 100 or heat exchanger (e.g., Boiler/HRSG) 200, emissions and water vapor loaded stream s1 (e.g. as described regarding FIG. 2 and FIG. 3) may enter nozzle (e.g., plenum) N1 of a first section 101B of the regenerative heat exchanger assembly, at which major water vapor content and residual sulfur compounds may be removed from the gaseous stream by condensation at low, near atmospheric pressure (e.g., the stream emitted from a power or industrial process that corresponds to stream s1 in FIG. 1 thru FIG. 3). The shell of first section 101B and external surfaces of tubes 151 may be covered by a thin coat of corrosion protection, whereas a coat covering tubes 151 may have a suitable (reduced or minimum) thermal resistance. A rectifier 150 of any suitable type may be installed downstream of entrance nozzle/plenum N1 to even a distribution of stream s1 along pipes 151 within section 101B in order to ensure mostly countercurrent movement of the emissions loaded stream. Pipes 151 may include longitudinal fins to improve both heat transfer and maintain countercurrent flow. The mixture of water, carbonic, and sulfuric acid (e.g., if any sulfur compound may be present) condensate may flow into a collector-separator 152 that may be sized in such way that the velocities of the gaseous phase may be less than the saltation velocities for a liquid droplet size of 100 μk or less. In such a way, an acidic condensate stream d4 may be collected at a discharge nozzle N4b primarily by gravity, whereas a gaseous phase passing through separator (e.g., internal demister) 153 may be evacuated through one or more nozzles N4a (e.g., that may be connected upstream of a demister 159 to an exit plenum equipped with a discharge nozzle N4). From there, low moisture stream s4 having lower (e.g., significantly or appreciably lower) mass and residual impurities (e.g., as described regarding FIG. 2) may enter a compressor station (e.g., as described regarding FIGS. 2 and 3). At relatively high pressures, residual moisture, $SO_2$ and $NO_2$ may be condensed in the exemplary disclosed intercoolers, and a condensate of ammonia ($NH_3$), and mercury (Hg) may be generated after passing an aftercooler (e.g., representing stream s6 connected to one or more nozzles N6 attached to separator 154. Liquefied emissions from stream s6 (e.g., as described regarding FIG. 2) may be collected and removed via a drain d6 at a suitable location (e.g., a lowest point) of separator 154. A size of separator 154 may be determined similarly to separator 153 as described above (e.g., maintaining internal separator velocities below saltation velocity for a lowest molecular weight impurity in the mixture). At this point, a pressurized, residual emissions-loaded gas stream may enter a section (e.g., a tubular section) of heat exchanger/cooler 101A that may be cooled by a relatively lower pressure (e.g., but significantly or appreciably higher than atmospheric) near-cryogenic stream that may be free of $CO_2$ and emissions after being discharged from expander 106B (e.g., as described regarding FIG. 2), which may enter the regenerative cooler assembly through plenum nozzle N11 into shell sections of the regenerative heat exchangers. To avoid freezing of the emissions within the tubular sections and to achieve smooth and continuous operation, at least one bypass assembly B104bx, B104ax, and B101x may be equipped with flow control dampers operated by any type of standard operators OP. Bypass assemblies B104bx, B104ax, and B101x may be placed within heat transfer surfaces of each regenerative heat exchangers 104 and 101A to control a rate of cold energy streams that may be bypassing the heat transfer surfaces of heat exchangers 104 and 101A, thus affecting correspondent outlet temperatures while reducing (e.g., minimizing) pressure drop and temperature stratification when compared to traditional by-pass design. At the cold stream outlets from said heat exchangers, rectifiers R1, R2, R3, and R4 may be installed to further reduce (e.g., minimize) temperature stratification between portions of the exemplary disclosed bypass and the remainder of the cooling flow.

After cooling the pressurized stream in regenerative section 101A, in which certain emissions (e.g., $H_2S$ and/or other emissions) may be liquefied and then collected in an outlet header-separator 156 having nozzle 155, whereas 156 may be sized to increase a retention of liquid phase droplets of 50 ppm or less to be then discharged through a drain d7, and whereas the dry portion of the flow may exit via one or more nozzles N7 into the first stage of expander 106A (e.g., as described regarding FIG. 2), where it may undergo a partial expansion. From the discharge of expander 106A, the effluent stream having (e.g., still having) a substantial pressure may enter heat exchanger (cooler) 104, through a nozzle N8a. The heat exchanger (cooler) 104 may include at least two sections equipped with an inlet 157 and one or more intermediate header-separators 158 for the purpose of substantially preventing carryover of the liquid emissions droplets that may freeze (e.g., causing ice build-up) in the section (e.g., may be connected immediately or in a downstream section that may operate at parameters such as P & T below a freezing point for a given emission type). The number of sections present in heat exchanger (cooler) 104 may be dictated by constituencies present in an exhaust gas (e.g., an original exhaust gas) leaving the exemplary disclosed main process (e.g., power or industrial). For example, if an incoming pressurized and partially expanded gas may contain impurities such as $H_2S$, NO, $CO_2$, then (e.g., from a drain d8a at inlet header N8a) a liquid $H_2S$ may be collected. NO may be collated from a drain d8b of header 158, while after controlled cooling in the cold section of heat exchanger 104 equipped with at least one bypass assembly B104bx, a two-phase stream containing liquefied $CO_2$ may flow into external separator 105 (e.g., as described regarding FIG. 2) through nozzle N8c.

A construction of regenerative heat exchanger assembly as illustrated in FIG. 4 may have an L-shaped design (e.g., may be configured to have a reduced height to make maintenance easier). The regenerative heat exchanger assembly may also be configured in any other suitable arrangement. The exemplary disclosed L-shape as illustrated in FIG. 4 may include straightening vanes SVx that may be suitable for a low pressure drop design. Alternatively, for example for applications having a relatively lower $CO_2$-Water Vapor-Emissions loaded stream (e.g., for industrial plants), the exemplary disclosed regenerative heat exchanger assemblies may be constructed as a vertical structure.

Figure 5A:
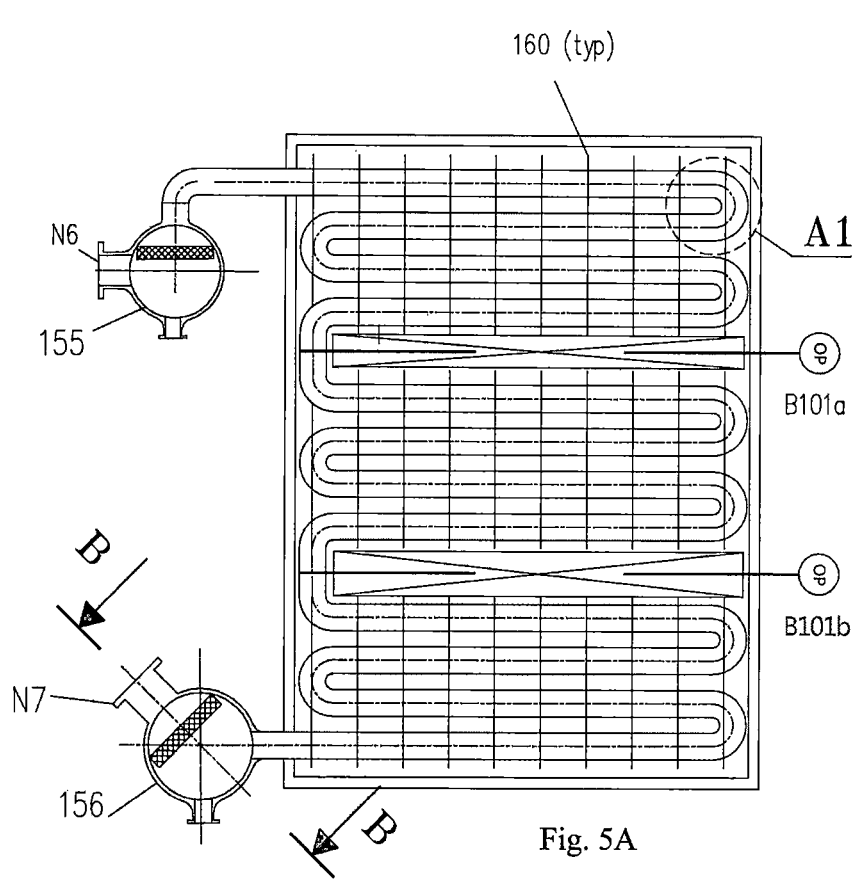
FIG. 5A illustrates a cross-sectional view of the exemplary embodiment (e.g., a Regenerative Condensing and/or Fractionation Heat Exchanger) of the present invention illustrated in FIG. 4.
Figure 5B:
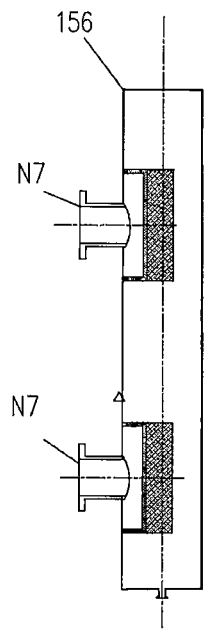
FIG. 5B illustrates another cross-sectional view (B-B) of the exemplary embodiment of the present invention illustrated in FIGS. 4 and 5A.
Figure 5C:
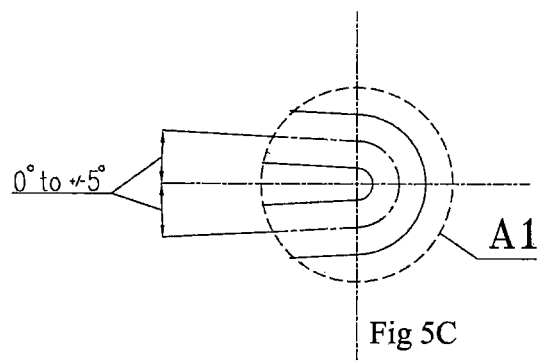
FIG. 5C illustrates a detailed view (A1) of the exemplary embodiment of the present invention illustrated in FIGS. 4 and 5A.

The regenerative heat exchanger assembly as illustrated in FIG. 4 shows individual sections (e.g., tubular sections) of the pressurized emissions water vapor loaded stream that may be arranged vertically (e.g., for the sake of clarity). Alternatively, the sections may have a horizontal arrangement as presented in the cross-sectional view A-A in FIG. 5A. As illustrated in FIG. 5A, the pressurized, emissions loaded stream may pass internally through a series of mostly horizontal pipes with an incline in the direction of flow less than ±5 degrees vs. horizon in at least some exemplary embodiments (e.g., see view A1 in FIGS. 5A and 5C). This exemplary design may allow suitable drainage of the heat transfer surface to prevent accumulation of liquefied emissions. In order to improve heat transfer in any section of the heat exchanger and to minimize the pressure drop (to optimize a turbulence level), fins 160 (typ) may be used as an integral part of the heat transfer surface. Bypass channel assemblies B101a and B101b may control cold energy rate to the heat transfer surfaces (e.g., with the help of control dampers and operators). The number of bypass assemblies may be based on many factors including, for example, composition of the emissions loaded stream, and/or pressurization and discharge pressure levels selected for compressors and expanders (e.g., as described above regarding FIG. 2). The cross-sectional view B-B in FIG. 5B illustrates an exemplary embodiment of a header-separator design having at least two discharge nozzles with a corresponding number of the demisters' baskets disposed around the outlet nozzles of the header-separators. Alternatively for example, the outlet header-separator as well as inlet header-separators attached to the series of tubes forming the heat transfer surface of the demister may be of a continuous design covering some or substantially an entire length of the header-separators.

The exemplary disclosed system, apparatus, and method may be used in any suitable application for capture from polluted gases. For example, the exemplary disclosed system, apparatus, and method may be used in any suitable application for carbon dioxide, water vapor, and/or hazardous emissions capture from polluted gases. The exemplary disclosed system, apparatus, and method may be used in any suitable application for removing $CO_2$, water vapor, and/or other hazardous emissions from an effluent gas stream leaving power plants, boilers, industrial plants, large fossil fuel fired boilers, and/or other power generation locations. The exemplary disclosed system, apparatus, and method may be used in any suitable application involving capture from polluted gases for green field and/or retrofit (e.g., brown field) projects.

In at least some exemplary embodiments, the exemplary disclosed method may include directing a stream into a compressor station, the stream being a pre-cooled effluent gaseous stream including $N_2$, $O_2$, $CO_2$, water vapor, and hazardous emissions when it is directed into the compressor station, bringing the stream to a medium range pressure by performing an isothermal compression using the compressor station, and sending the stream into a first regenerative heat exchanger, at which a temperature of the stream is lowered to below a condensation temperature of $CO_2$ and causing its liquefaction thereby transitioning or transforming the incoming stream into a two-phase stream. The exemplary disclosed method may also include directing the two-phase flow into one or more inertia separators to collect said liquid phase including $CO_2$ in a pressurized storage, directing a gaseous portion of a two-phase stream that leaves the one or more inertia separators into an expander, the stream being a high pressure, low temperature purified stream when leaving the one or more inertia separators, and directing an effluent stream from the expander to the first regenerative heat exchanger, the effluent stream being subcooled to near-cryogenic temperature, free of the $CO_2$ and the hazardous emissions to provide the source of cold energy to achieve deep cooling of the stream directed into the first regenerative heat exchanger. The temperature of the stream may be lowered at the first regenerative heat exchanger by the effluent stream from the expander. The exemplary disclosed method may also include offsetting some of the power used by the compressor station utilizing residual cold energy of the cooling stream leaving the first regenerative heat exchanger in the second regenerative heat exchanger disposed upstream of the compressor station. The stream, which may be a low pressure contaminated effluent gaseous stream upstream of a second regenerative heat exchanger that is disposed upstream of the compressor station, may undergo a substantial cooling upstream of the compressor station in the second regenerative heat exchanger that utilizes the residual cold energy of the purified stream leaving the first regenerative heat exchanger to cool the stream upstream of the compressor station, causing condensation and removal of water vapor and some impurities from the stream upstream of the compressor station. The compressor station may include at least two pressurization stages having one or more intercoolers and an aftercooler. Waste heat energy absorbed at the compressor station may be sent to an adsorption chiller that generates a cold stream used by the second regenerative heat exchanger, whereas the cold stream from the adsorption chiller may supplement cooling duties provided by the cold purified exhaust stream leaving the first regenerative heat exchanger in the second regenerative heat exchanger disposed upstream of compressor station. Cooling of a high pressure contaminated effluent gaseous stream within the one or more intercoolers and the aftercooler hydraulically connected to the compressor station may condense and liquefy residual water vapor and hazardous components contained by the high pressure contaminated effluent gaseous stream for disposal at an ambient temperature. The expander may include a first expansion stage and a second expansion stage. Disposing the first regenerative heat exchanger downstream of the first expansion stage may direct an exhaust of the first expansion stage into a warmer section of the first regenerative heat exchanger, which may allow $CO_2$ and NO removal by liquefaction at higher than ambient pressure using cold energy held by a purified exhaust stream from the second expansion stage disposed downstream of the first regenerative heat exchanger. A purified gaseous stream disposed downstream of the expander may be directed into a third regenerative heat exchanger disposed upstream of the first expansion stage. A collected liquefied stream of $CO_2$ of the stream may be pressurized to a pressure for sequestration or reuse, which may supply cold energy to the purified gas stream via another heat exchanger disposed either between the first and the third regenerative heat exchangers or between the third and the second regenerative heat exchangers. A pressurized stream may be further subcooled in a fourth regenerative heat exchanger before entering the second expansion stage, which may prevent a carryover of an excess of liquid $CO_2$ particles into the second expansion stage, and cold energy may be produced by vaporization of depressurized liquid $CO_2$ supplied from a $CO_2$ tank. The exemplary disclosed method may further include directing the effluent stream to the atmosphere.

In at least some exemplary embodiments, the exemplary disclosed system may include a compressor station having an intercooler and an aftercooler, a regenerative heat exchanger disposed upstream of the compressor station, an expander, a common shaft connecting the compressor station to the expander and to a motor to provide a balance of input power to suit the operation of the system, and a plurality of additional regenerative heat exchangers that may be configured to exchange hot and cold energies produced by compression and expansion of streams within the system to at least in part compensate energy used to condense or liquefy impurities held by a contaminated stream. The plurality of additional regenerative heat exchangers may be interconnected with the compressor station and the expander. The exemplary disclosed method may also include a plurality of gas-liquid separators and a storage tank for temporary storage of emissions and $CO_2$. The plurality of additional regenerative heat exchangers may be interconnected with the compressor station, the expander, the plurality of gas-liquid separators, and the storage tank. Each of the regenerative heat exchanger and the plurality of additional regenerative heat exchangers may be assembled within a single structure having multiple sections of heat transfer surfaces interconnected via a plurality of gas-liquid separators. The exemplary disclosed method may further include at least one internal passage formed within a cold side of the multiple sections. The at least one internal passage may include at least one inlet flow control damper configured to adjust a rate of cold energy delivered to the heat transfer surface. Each of the regenerative heat exchanger and the plurality of additional regenerative heat exchangers may include a tubular heat transfer surface that may be inclined in a direction of flow of up to ±5 degrees from horizontal. The motor may be an electric motor supplying a balance of power used by the system.

In at least some exemplary embodiments, the exemplary disclosed system may include directing a contaminated effluent gaseous stream into a compressor station, the stream being a pre-cooled effluent gaseous stream including at least $CO_2$, ballast gases including $N_2$, $O_2$ and water vapor, and hazardous emissions when it is directed into the compressor station, performing an isothermal compression utilizing a plurality of inter- and aftercoolers on the stream using the compressor station, sending the stream into a first regenerative heat exchanger, at which a temperature of the stream is lowered to below a condensation temperature of $CO_2$ and causing its liquefaction thus transforming it into a two-phase stream, and taking in the stream that leaves the first regenerative heat exchanger using an expander, the stream being a high pressure purified stream when leaving the first regenerative heat exchanger. The exemplary disclosed method may also include directing an effluent stream from the expander to the first regenerative heat exchanger, the effluent stream being a cold cooling stream free of the $CO_2$ and the hazardous emissions, and offsetting some of the power used by the compressor station based on the temperature of the stream being lowered at the first regenerative heat exchanger by the effluent stream. The temperature of the stream may be lowered at the first regenerative heat exchanger by the cold energy of the effluent stream from the expander. The stream, which may be a low pressure contaminated effluent gaseous stream upstream of a second regenerative heat exchanger that is disposed upstream of the compressor station, may undergo a substantial cooling upstream of the compressor station in the second regenerative heat exchanger that utilizes the stream leaving the first regenerative heat exchanger to cool the stream upstream of the compressor station, causing condensation and removal of water vapor and some impurities from the stream upstream of the compressor station. The compressor station may include at least two pressurization stages having one or more intercoolers and an aftercooler. Waste heat energy absorbed at the compressor station may be sent to an adsorption chiller that may generate a cold stream used by the second regenerative heat exchanger. Cooling of the low pressure contaminated effluent gaseous stream upstream of the compressor station may condense and liquefy hazardous components for disposal at an ambient temperature within the one or more intercoolers and the aftercooler.

In at least some exemplary embodiments, the exemplary disclosed system, apparatus, and method may provide an efficient and effective system for $CO_2$ capture that mitigates parasitic power losses, simplifies process and system construction while avoiding use of solvents, membranes, and adsorbents, and allows collection of $CO_2$, water vapor, and other hazardous emissions by an efficient method (e.g., a single non-cryogenic method). For example, the exemplary disclosed system, apparatus, and method may provide a technique to substantially simplify carbon dioxide capture process and conventional hazardous greenhouse gaseous emissions control, thus minimizing construction and operating costs, as well as preserving initial plant's capital costs. The exemplary disclosed system, apparatus, and method may also substantially avoid the use of intermediate reactants and materials (e.g., membranes) production or manufacturing that may present a secondary source of $CO_2$ emittance to the atmosphere and may involve additional recurrent operating costs and safety of operation issues. The exemplary disclosed system, apparatus, and method may further substantially reduce parasitic power losses and capital costs associated with sequestration, storage, and transportation of captured carbon dioxide and other greenhouse-related emissions that may be hazardous for human life.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. A method, to liquefy and collect emissions, a $CO_2$, and a water vapor from an exhaust of power and industrial plants comprising:
    directing a low-pressure, pre-cooled gaseous stream into a compressor station whereas the stream is a pre-conditioned original exhaust of a power or industrial plant containing 4% to 15% of the $CO_2$ by volume, the emissions including NO, $NO_2$, $SO_2$, $SO_3$, HF, HCl, Hg, or $NH_3$ and a balance being a major mass portion of the stream consisting of a nitrogen ($N_2$), an oxygen ($O_2$), and the water vapor;
    increasing pressure of the low-pressure, pre-cooled gaseous stream by performing an isothermal compression using the compressor station to form a pressurized gaseous stream;
    sending the pressurized gaseous stream into a first regenerative cooling heat exchanger downstream of the compressor station, at which a temperature of the pressurized gaseous stream is lowered at the exit of the first regenerative cooling heat exchanger to below a condensation temperature of $CO_2$ and causing a fractionation by a condensation of the pressurized gaseous stream by its individual constituencies according to the constituencies' physical properties and an operating pressure and temperature conditions within the first regenerative cooling heat exchanger whereas a liquefied constituencies include a residual water vapor, a residual emissions, and a liquid $CO_2$ thereby transitioning or transforming the pressurized gaseous stream into a two-phase stream;
    directing the two-phase stream into a plurality of gas-liquid separators to collect the liquified constituencies individually from the two-phase stream;
    directing the liquefied constituencies collected by the plurality of gas-liquid separators into a treatment plant, and a liquid phase of the residual emissions into individual pressurized storages, and the liquid $CO_2$ into a liquid $CO_2$ pressurized storage;
    directing a gaseous portion of the two-phase stream that leaves a last gas-liquid separator disposed downstream of the first regenerative cooling heat exchanger into an expander, the stream being a pressurized, low temperature stream that is a $CO_2$-Moisture-Elnissions free stream after leaving the last gas-liquid separator; and directing an effluent stream from the expander to the first regenerative cooling heat exchanger, the effluent stream being the $CO_2$-Moisture-Emissions free stream subcooled by a polytropic expansion in the expander to a near-cryogenic temperature range approaching −238° F., to provide a source of cold energy to achieve the fractionation of the pressurized gaseous stream by condensation whereas the cold energy source provides for an absorption of a sensible heat of the pressurized gaseous stream and a total latent heat of its constituencies including the $CO_2$, the residual emissions, and the residual water vapor in the first regenerative cooling heat exchanger, and wherein the $CO_2$-Moisture-Emissions free stream consisting primarily of the nitrogen and oxygen being a major mass portion of the pressurized stream generates a mechanical work after passing through the expender thus offsetting a power used by the compressor station resulting in a substantial reduction of an external electrical power required to realize the method.

2. The method of claim 1, further comprising offsetting some of the power used by the compressor station utilizing a residual cold energy of the $CO_2$-Emissions-Moisture free stream leaving the first regenerative cooling heat exchanger in a second regenerative cooling heat exchanger disposed upstream of the compressor station to form the low-pressure, pre-cooled, gaseous stream directed into the compressor station.

3. The method of claim 2, wherein the cooling in the second regenerative cooling heat exchanger provides for condensation of the water vapor attaining the residual water vapor concentration of about 1% by volume and a portion of the emissions by an absorption in or by a reaction with the water vapor and/or by some of the emissions condensation at an operating pressure and temperature in the second regenerative cooling heat exchanger thus forming an acidic condensate stream, and the acidic condensate stream consisting of some water vapor condensate and the absorbed emissions producing a mixture of carbonic, nitric, chloride, and sulfuric acids, resulting from NO, $NO_2$, $CO_2$, HF, HCl, $SO_2$, or $SO_3$ absorption by, and reaction with the water vapor thus become suitable for removal by the plurality of gas-liquid separators before the low-pressure, pre-cooled gaseous stream enters the compressor station, and directing the acidic condensate stream into the treatment plant before disposal of a purified water into the environment or for reuse for any technical purposes.

4. The method of claim 1, wherein:

a waste heat energy absorbed by a medium used in an intercoolers and an aftercooler at the compressor station consisting of one or more stages is sent to an adsorption chiller that generates a secondary cold energy stream; and whereas the secondary cold energy stream from the adsorption chiller supplements a cooling duties provided by the residual cold energy of the $CO_2$-Emissions-Moisture free stream after leaving the first regenerative cooling heat exchanger.

5. The method of claim 4, wherein cooling of the pressurized gaseous stream, within the intercoolers and the aftercooler hydraulically connected to the compressor station causes further fractionation at an elevated pressure by condensation of the residual water vapor and a portion of the emissions retained by the low pressure, pre-cooled gaseous stream before entering the compressor station, whereas a condensed fractions produced within the intercoolers and aftercoolers become suitable for collection by the plurality of gas-liquid separators and disposal of the condensed fractions at an ambient temperature;

disposing the condensed fractions of the residual water vapor condensate and the portion of the emissions from the plurality of gas-liquid separators hydraulically connected to the intercoolers and the aftercooler into the treatment plant and/or into the individual pressurized storages by the condensed fractions.

6. The method of claim 1, wherein:

the expander includes a first expansion stage and a second expansion stage; and directing an exhaust of the first expansion stage precooled by its polytropic expansion before entering the first regenerative cooling heat exchanger, where the fractionation by condensation and removal of the residual water vapor, the residual emissions, and the $CO_2$ occurs at a higher than the atmospheric pressure due to the cold energy supplied by the $CO_2$-Emissions-Moisture free stream having the near-cryogenic temperature range after its polytropic expansion in the second expansion stage disposed downstream of the last gas-liquid separators located downstream of the first regenerative cooling heat exchanger;

wherein a mass of the pressurized gaseous stream that passes the first expansion stage consists primarily of the nitrogen, the oxygen, and the gaseous $CO_2$ and the mass of $CO_2$-Moisture-Emissions free stream consisting primarily of the nitrogen and the oxygen that passes the second expansion stage thus collectively generate more the mechanical work and correspondingly offsetting more of the power used by the compressor station resulting in a greater overall reduction of the external electrical power required to realize the method.

7. The method of claim 6, wherein the $CO_2$-Moisture-Emissions free stream after transferring its cold energy in the first regenerative cooling heat exchanger is directed into a third regenerative cooling heat exchanger disposed upstream of the first expansion stage to fractionate by condensation a remaining water vapor and a portion of a remaining regulated emissions at the elevated pressure after leaving the compressor station aftercooler, thus concurrently enhancing a polytropic cooling effect downstream of the first expander and the remaining regulated emissions removal by forming another acidic liquid stream collected by one of the plurality of gas-liquid separators disposed downstream of the third regenerative cooling heat exchanger whereas the said acidic liquid stream is directed into the treatment plant and a gaseous portion of the stream into the first expansion stage.

8. The method of claim 1, wherein the liquid $CO_2$ from the liquid $CO_2$ pressurized storage is further pressurized to a pressure required by any selected sequestration or its reuse methods, transfers its cold sensible energy to the pressurized gaseous stream downstream of compressor station and/or to the low pressure, pre-cooled stream upstream of the compressor.

9. The method of claim 1, wherein the pressurized $CO_2$-Moisture-Emissions free stream is further subcooled in a fourth regenerative cooling heat exchanger before entering the expander or the second expansion stage, to prevent a carryover of some entrained liquid $CO_2$ droplets or particles passing through the last gas-liquid separator, utilizing a cold energy produced by a polytropic depressurization of a vaporized $CO_2$ in a pressure control valve attached to the liquid $CO_2$ pressurized storage, whereas the vaporized $CO_2$ is formed above the liquid $CO_2$ surface in the liquid $CO_2$ pressurized storage due to a heat transfer from an ambient air.

10. The method of claim 6, whereas the $CO_2$-Moisture-Emissions free stream consisting primarily of the oxygen and the nitrogen after transferring its cold energy in a last regenerative cooling heat exchanger to form the pre-conditioned original exhaust of power or industrial plant is preheated above the ambient air temperature before exiting into the atmosphere, and whereas the pre-conditioned original exhaust is the low-pressure, pre-cooled gaseous stream that enters the compressor station, and whereas the last regenerative cooling heat exchanger in one application of the method is the second regenerative cooling heat exchanger or in another application of the method is a fifth regenerative heat exchanger, and wherein in both cases mentioned herein regenerative cooling heat exchangers are disposed upstream of the compressor station.

11. A system consisting of:

a compressor station having at least one compression stage equipped with an intercoolers and an aftercooler, whereas an incoming a lows-pressure, pre-conditioned gaseous stream originated at an exhaust of a power or industrial plant is pressurized to produce a pressurized stream; an expander having at least one expansion stage to concurrently generate a mechanical work and a cold energy in a form of a gaseous near-cryogenic temperature stream having its temperature approaching $-238°$ F.;

an electric motor to provide a balance of power consumed by the compressor station less the mechanical work generated by the expander to sustain the system operation;

a plurality of the regenerative cooling heat exchangers interconnected via a plurality of gas-liquid separators to perform a fractionation of the pressurized stream by condensation of emissions and a $CO_2$ and their separation by individual liquefied components, and a plurality of pressurized storages to collect the individual liquefied components discharged from the plurality of the gas-liquid separators while the pressurized stream passes through the plurality of the regenerative cooling heat exchangers;

a stack to discharge to the atmosphere a $CO_2$-Moisture-Emissions free stream formed as a result of the pressurized stream fractionation by condensation and the liquefied components separation after passing through the plurality of the regenerative cooling heat exchangers interconnected via the plurality of the gas-liquid separators, and whereas a cold energy required to form the liquefied components is supplied by the $CO_2$-Moisture-Emissions free stream after its polytropic expansion in the expander, and the plurality of the regenerative cooling heat exchangers and the plurality of the of the gas-liquid separators assembled as a stack, and the stack is assembled in as a single structures;

a steam turbine that generates an additional mechanical work utilizing an excess of steam resulted from a waste heat utilization from an original exhaust of a power or industrial plant power and/or a waste heat energy produced by the intercooler and the aftercoolers of the compressor station;

an absorption chiller that provides a supplemental cold energy stream by absorbing the waste heat produced by the intercooler and the aftercoolers of the compressor station.

12. The system of claim 11, wherein to simplify the single structure design and construction, to minimize a pressure drop, and a temperature stratification across the plurality of the regenerative cooling heat exchangers at least one of an internal bypass assembly is provided to pass a portion of the $CO_2$-Moisture-Emissions free stream whereas the bypass assembly is disposed internally within each heat transfer surface of the plurality of regenerative cooling heat exchangers;

wherein at least one of the internal bypasses is constructed with at least one inlet flow control damper in each bypass configured to control a rate of the cold energy delivered by the $CO_2$-Moisture-Emissions free stream to each of the plurality of regenerative cooling heat exchanger.

13. The system of claim 11, wherein the plurality of regenerative cooling heat exchangers and the intercoolers and the aftercooler used for cooling of the pressurized stream have their heat transfer surfaces oriented horizontally to accommodate the pressurized gaseous stream transitioning into a two-phase stream flowing through a heat transfer surface inclined in a direction of flow from minus 0.01 to minus 5 degrees from the horizontal line to allow a positive discharge of the liquified constituencies of the two-phase flow within the tubular heat transfer surfaces before entering the plurality of the gas-liquid separators interconnecting all sections of the plurality of regenerative cooling heat exchangers.

14. The system of claim 11, wherein a rotor of the compressor station, a rotor of the expanders, and a rotor of the electric motor that is supplying the balance of power required by the system operation are constructed as a common power train.

15. The method of claim 1, realizes a removal of the emissions, water vapor, and $CO_2$ from the original exhaust of power and industrial plants by a singular process that utilizes an internally generated cold energy source in a form of the $CO_2$-Moisture-Emissions free stream consisting primarily of a gas mixture of $O_2$ and $N_2$ having the near cryogenic temperature to fractionate the original exhaust gas from power or industrial plant by condensation and collection of the emissions, the water vapor condensate, and the $CO_2$ by their individual liquefied constituencies.

16. The method of claim 1, wherein the the $CO_2$ collected in the liquid phase from the gaseous exhaust of a power or industrial plant reduces a parasitic power required for the $CO_2$ pressurization for its delivery to a sequestration site by an order of magnitude.

17. The system of claim 11, wherein the plurality of gas-liquid separators, interconnecting the plurality of regenerative cooling heat exchangers are designed as a header having its diameter sized to maintain a velocity of the gas phase below a saltation velocity of a droplets larger than 100 microns or less.

18. The system of claim 11, wherein the structure is arranged as a L-Shape structure to minimize construction costs and a parasitic pressure losses of the $CO_2$-Moisture-Emissions free stream across the structure, whereas in a case of a limited construction site space availability the structure can be constructed as a vertical structure to minimize its footprint.

19. The system of claim 11, wherein the waste heat energy produced by the intercoolers and aftercoolers in the compression station and/or the waste heat energy contained by the original exhaust of a power or industrial plant provide a thermal energy credit for a partial substitution of a thermal duties fulfilled by a steam extracted from an existing steam turbine to preheat a feed water in an existing regenerative heaters and/or to generate an additional steam from a suitable water source thus producing an excess of steam, and whereas the excess of steam is used in the existing steam turbine and/or the steam turbine in the system to generate either additional electrical power, or an additional mechanical power respectively thus reducing the balance of power required for the system operation, and whereas a rotor of the steam turbine belonging to the system, is connected to the common power train.

* * * * *